(12) United States Patent
Kochan, Jr.

(10) Patent No.: US 10,079,567 B2
(45) Date of Patent: Sep. 18, 2018

(54) MONITOR AND CONTROL SYSTEMS FOR A MOTOR SHAFT

(71) Applicant: METROPOLITAN INDUSTRIES, INC., Romeoville, IL (US)

(72) Inventor: John Kochan, Jr., Naperville, IL (US)

(73) Assignee: METROPOLITAN INDUSTRIES, INC., Romeoville, IL (US)

( * ) Notice: Subject to any disclaimer, the term of this patent is extended or adjusted under 35 U.S.C. 154(b) by 0 days.

(21) Appl. No.: 15/415,149

(22) Filed: Jan. 25, 2017

(65) Prior Publication Data

US 2018/0212547 A1 Jul. 26, 2018

(51) Int. Cl.
| | |
|---|---|
| *G01R 31/02* | (2006.01) |
| *H02H 3/04* | (2006.01) |
| *H02P 7/08* | (2006.01) |
| *H02P 29/024* | (2016.01) |
| *H02K 11/25* | (2016.01) |
| *H02P 6/08* | (2016.01) |
| *H02J 7/16* | (2006.01) |
| *H04W 4/00* | (2018.01) |
| *H04M 11/00* | (2006.01) |
| *H04W 4/80* | (2018.01) |

(52) U.S. Cl.
CPC ............. *H02P 29/024* (2013.01); *H02J 7/16* (2013.01); *H02K 11/25* (2016.01); *H02P 6/08* (2013.01); *H04M 11/007* (2013.01); *H04W 4/008* (2013.01); *H04W 4/80* (2018.02)

(58) Field of Classification Search
CPC .............................. H02P 29/024; H02K 11/25
USPC ......................................................... 318/490
See application file for complete search history.

(56) References Cited

U.S. PATENT DOCUMENTS

| 8,400,093 B2* | 3/2013 | Knox | H02P 3/00 318/255 |
|---|---|---|---|
| 2014/0244101 A1* | 8/2014 | Chitty | E02F 9/2054 701/31.6 |
| 2016/0047703 A1* | 2/2016 | Ha | H02J 5/005 73/862.331 |
| 2017/0170773 A1* | 6/2017 | Donolo | H02K 11/21 |

* cited by examiner

*Primary Examiner* — Erick Glass
(74) *Attorney, Agent, or Firm* — George S. Pavlik; Husch Blackwell LLP

(57) ABSTRACT

A system monitors physical characteristics of or near a motor shaft, such as strain, temperature, voltage, and/or stress. The sensors can sense or measure these characteristics and transmit the measured values wirelessly to a remote user, who can monitor the motor shaft for signs of inefficiency or malfunction. Furthermore, the system can support communications between the remote user and a controlling element of the motor to monitor and adjust the motor shaft to operate with greater efficiency and safety.

15 Claims, 3 Drawing Sheets

MONITOR AND CONTROL SYSTEMS FOR A MOTOR SHAFT

FIELD

The application relates to systems which sense or measure physical attributes of a motor shaft or similar structure, such as vibration, temperature, or strain, and further support remote communication of that information to a remote user in real-time, as well as relay remote user instructions to a controlling element of the motor. More particularly, these systems can be connected to a motor shaft to monitor and adjust the operation of the motor.

BACKGROUND

Electric motors are susceptible to mechanical problems from a number of causes. Such mechanical problems are often heralded by physical changes in or near the motor shaft, such as changes in temperature, vibrations, voltage, or strain, changes that can be sensed and measured. These changes signal the possibility that the motor shaft is operating at suboptimal efficiency or is at risk of mechanical malfunction or even mechanical failure.

For example, increased strain can indicate that a motor shaft is under-loaded or over-loaded. As another example, a measurable increase in strain on a motor shaft combined with a concurrent change in motor shaft vibrations and temperature outside of certain value ranges can signal incipient mechanical failure for the motor shaft.

It can be advantageous for improved systems that can detect such physical changes manifested by or near a motor shaft and transmit that information to a remote user via wireless communications, and further to transmit instructions from the remote user to a controlling element of the motor; such systems could prevent motor malfunction or failure. It can also be advantageous to enable remote users to monitor motor shafts for physical signs of inefficient operation and to communicate with the controlling elements of the motor to adjust the operation of the motor until those physical manifestations are corrected or mitigated. It can be particularly advantageous to monitor and control the motors from a remote location, for reasons of convenience, safety, and speed of response.

SUMMARY

It is an object of the invention to provide a system that includes a monitoring element that can detect and quantify physical characteristics associated with a motor shaft, such as its temperature, the strain experienced by the motor shaft, and vibrations. It is also an object to employ a plurality of sensors that can detect these characteristics.

It is further an object of the invention to provide a communication module that can enable the transmission of such measurements or information collected by the sensors to a remote user via a wireless interface. It is another object of the invention to provide an alarm when the system detects measured values for physical attributes on or near the motor shaft that fall out of predetermined ranges of values.

It is another object of the invention for the system to include a communication module that can enable the transmission of commands or information from the remote user to a control module of the motor, for example, to enable the remote user to adjust the operation of the motor shaft after receiving information that indicates that the motor shaft may be performing at a suboptimal or unsafe manner.

It is another object of the invention for the system to include a power source. It is a further aspect of the invention for the power source to include a battery and a battery charger. Preferably, such battery charger can be structured and arranged to charge the battery by converting energy generated by the operation of the motor in the form of, for example, heat, vibration, movement, or electromagnetic force, so that the system requires no external power source to operate.

Another aspect of the invention includes an apparatus that can have a housing that contains and positions the sensors and communication module, and the power source if present, so that the system can be connected to or embedded in a motor shaft or other motorized structure.

Another aspect of the invention is a method that can remotely monitor physical attributes of a motor shaft, where changes in those physical attributes can indicate that the motor shaft is operating in an inefficient or unsafe manner. It is another object of the invention to further include a control system that can enable the user to send commands to the motor for adjusting its operation to achieve improved functioning of the motor shaft and the motor.

DETAILED DESCRIPTION

Figure 1:
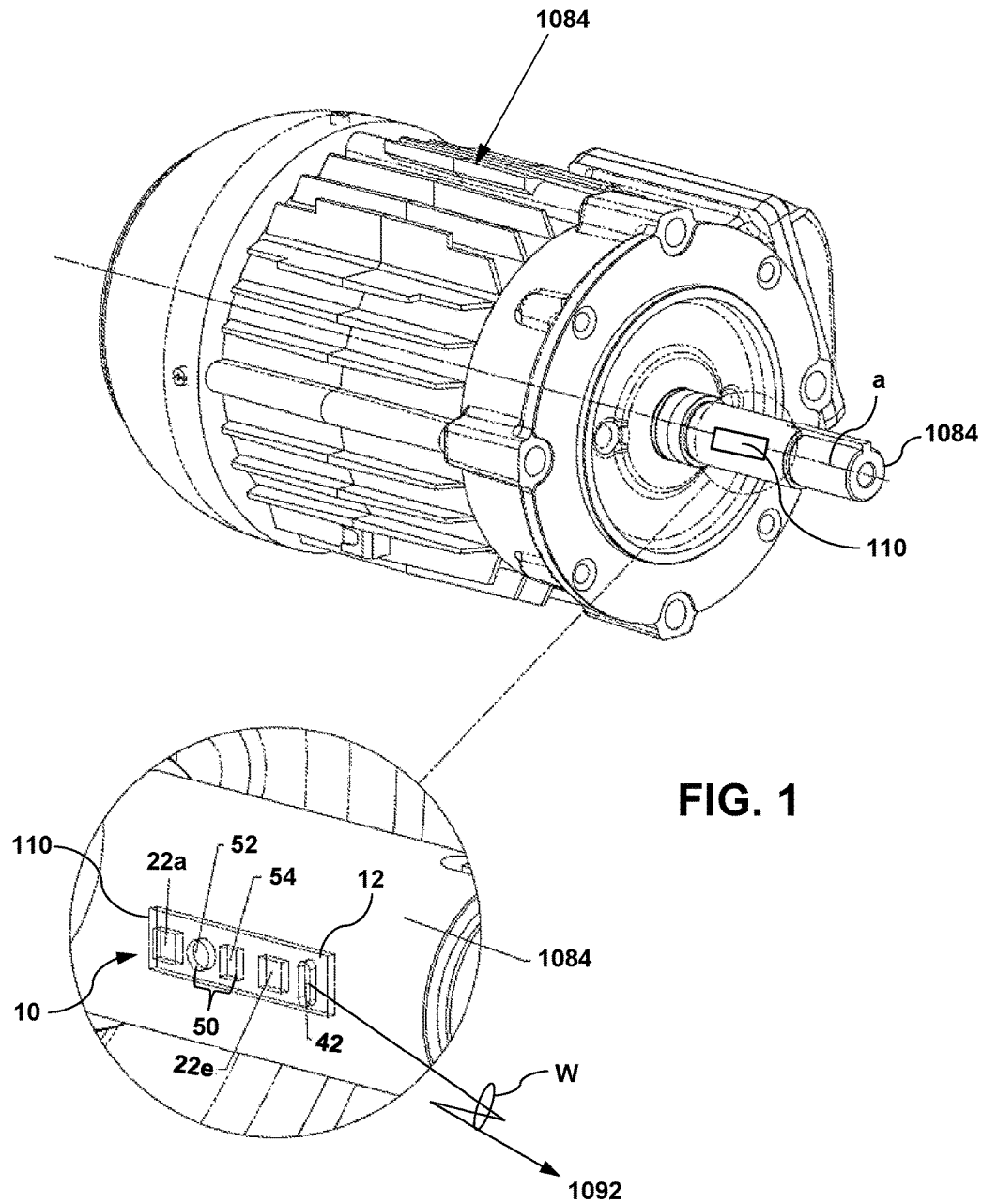
FIG. 1 is a schematic diagram illustrating a configuration of a system according to embodiments presented herein.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

As shown by FIGS. 1-4, systems can be used to monitor the operation of a motor shaft and to transmit two-way communications between the system and an external user. Such systems can enable an external user to monitor physical attributes of the motor (or the environment around the motor) that indicate or reflect the efficiency of the motor's operation. These systems can allow external users to determine whether a motor is running within desired parameters, operating inefficiently, experiencing stresses, or in danger of overload or failure and to communicate remotely with the motor, allowing the remote users to respond to information supplied by the system by altering the motor's operations to run more efficiently or to avoid malfunction or overload.

The system can measure physical attributes indicative of inefficient or suboptimal motor function, such as the presence of elevated temperatures, vibrations, voltage, particle counts, atmospheric pressure or quality, or strain and communicate or transmit those measurements to an external user, or combinations thereof.

In some instances, the system can perform calculations to transform the measured values into quantifiable metrics. For example, the system can include a strain gauge which can measure the electrical resistance of the motor and calculate the amount of stress experienced by the motor. Similarly, a system can measure the temperature of the motor directly, or can measure temperatures at one or more locations near the motor and calculate or determine the temperature of the motor indirectly.

FIG. 1-4 illustrate a motor shaft monitor system 10 in accordance with embodiments disclosed herein. The system 10 can include a housing 12, which can be made as an apparatus 110 connected to or mountable to a motor shaft 1084.

The housing 12 can contain sensors 22, 22a-22e and communication module 42, and power source 50 if present, so that the system 10 can be connected to or embedded on a motor shaft 1084 or other motorized structure 1082.

The housing 12 can include a plurality of sensors 22, which can be arranged to sense or detect one or more physical conditions of the motor shaft 1084 or conditions near the motor shaft 1084. The sensors 22 can be coupled to the housing 12 by a connector 26.

In preferred embodiments, the system 10 can include a strain gauge sensor 22a which can determine the strain experienced by the motor shaft 1084 and at least one secondary sensor 22b-22e for measuring vibrations, temperature, or stress, or any combination thereof. Sensors 22 for other measurements reflective of motor shaft operation, such as voltage (not shown) can also serve as secondary sensors.

Figure 2:
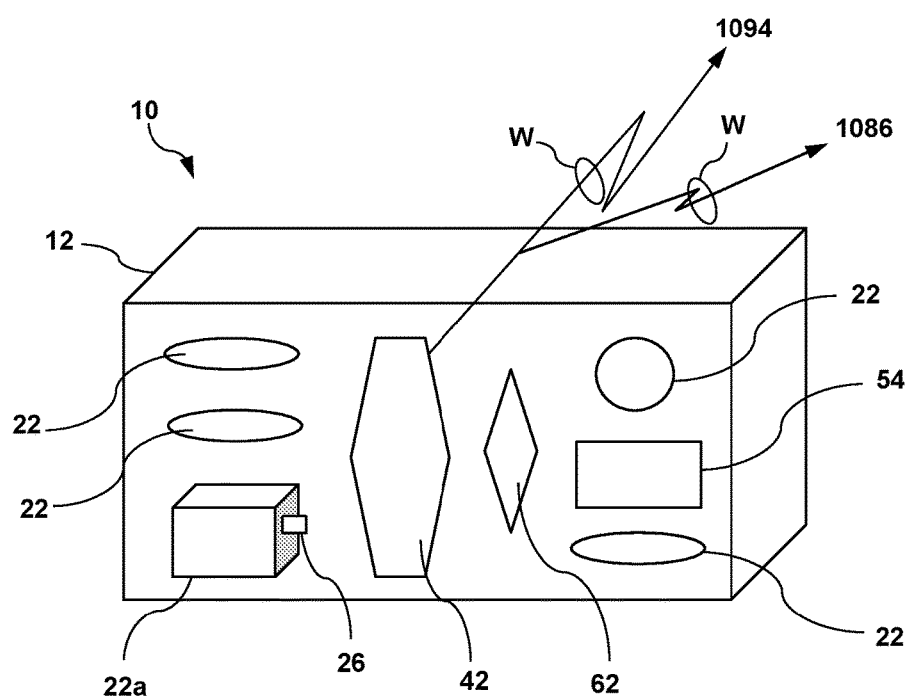
FIG. 2 is a schematic diagram illustrating an alternative configuration of a system.

The sensors 22 can include, for example, a strain gauge sensor 22a to measure strain placed upon the motor shaft, a temperature sensor 22c to measure the temperature of the motor shaft, a vibration sensor 22b to measure vibrations in the motor shaft, or a stress sensor 22d for determining the stress placed upon the motor shaft (as shown in FIG. 2). As shown in FIG. 1, the housing 12 can include multi-purpose sensors 22e that sense more than one physical condition of the motor shaft 1084, such as a sensor that senses vibration, heat, voltage, and stress. With this information, the system 10 can, for example, measure the torque of the motor shaft 1084 and compare it with the speed of the motor shaft 1084 to measure the operating efficiency of the motor shaft 1084.

The housing 12 can include other sensors 22 for measuring environmental conditions outside of the motor shaft 1084, such as sensors that measure air quality, air-borne particulates, smoke, or air pressure.

The sensors 22 acquire information about the physical attributes of the motor shaft 1084 and are coupled to a communication module 42. The communication module 42 can provide bi-directional messaging between the system 10 and a displaced electronic device 1094 located at a site remote from the motor 1082.

Communication module 42 can include a wireless communication input/output interface associated control circuitry for enabling two-way communications between the system 10 and a displaced electronic device 1094 (or in the alternative, a remote user 1092), with the wireless communication including a wireless communication interface W providing network communications via one or more of a local area network, Wi-Fi communication, a Bluetooth connection 44, telecommunication system, computer network enabled interface 46, private data network, or the Internet.

Communication module 42 can be configured for receiving digital data from external devices, for example, in a wireless manner. The wireless interface W can communicate wirelessly via wireless medium W, and a computer network, such as the internet I with a displaced electronic device 1094 (e.g. a user's wireless phone, tablet or computer) to provide updates as well as receive instructions for managing the settings of the control circuits of motor 1082.

The communication module 42 can wirelessly communicate the information detected or determined by the plurality of sensors to a displaced electronic device 1094 at a remote location separate from the motor 1082. The information can be updated and transferred continuously or at preset intervals of time, for example, once per minute, once per hour, or daily.

Alternatively, the communication module 42 can transmit the information obtained by the sensors 22, 22a-22e to a remote electronic device 1094 at the request of remote user, the request or command transmitted wirelessly from the remote electronic device 1094 to the system 10 via the same (or another) communication module.

In some embodiments, the communication module 42 can further provide communications between a remote electronic device 1094 and a controlling element of the motor (not shown).

According to exemplary embodiments shown in FIG. 1, a system 10 for monitoring a motor shaft 1084 can include a plurality of sensors 22; a communication module 42 for communicating between the system 10 and a displaced electronic device 1094 located at a site remote from the motor shaft 1084; a battery 52 for powering the communication module 42; and a battery charger 54 for powering the battery 52 by the operation of the motor shaft 1084; with the communication module 42 communicating the information determined by the sensors 22 to the displaced electronic device 1094.

Exemplary embodiments can further include a strain gauge sensor 22a plus at least one additional sensor 22 for determining vibrations experienced by the motor shaft (vibration sensor 22b), the temperature of the motor shaft (temperature sensor 22c), the stress experienced by the motor shaft (stress sensor 22d), or a multi-purpose sensor (22e).

In another aspect, as shown in FIG. 2, the system 10 can include a system control element 62 that receives the information obtained by a plurality of sensors 22 and transmits a communication to a remote user 1092 when a measurement falls outside a predetermined range of values for that measurement. For example, a message can be sent when the temperature rises above a specified temperature that is either preset or set by a remote user 1092. Such message might include the information obtained by the sensors 22 or further comprise an alarm to signal the remote user 1092 that the motor 1082 may be operating in a suboptimal manner.

The system control element 62 can also be programmed to send commands to a control module of the motor (not shown) when a measurement falls outside a predetermined range of values for that measurement, for example causing the motor shaft 1084 to change speed based on the measurements obtained by a strain gauge sensor 22a or directing the motor 1082 to shut down if a temperature sensor 22c detects a temperature that indicates that the motor 1082 is overheating.

The communications between the system 10 and the controller of the motor 1082 can be of the same type of the communications between the system 10 and a remote user 1092; that is, a bi-directional form of communication, or some other type of communication. In some embodiments, the communication module 42 can support transmission and receipt of information between the system 10 and the controller of the motor shaft 1084.

Exemplary embodiments can further include a power source 50 coupled to the system. The power source 50 can include a battery 52 for powering the sensors 22, communication module 42, and system control element 62.

In some embodiments, the power source 50 further includes a battery charger 54 for powering the battery 52. The battery charger 54 can deliver charging power to the battery 52 by operation of the motor shaft 1084 so that the system 10 requires no external power source for system operation. For example, the battery charger 54 can convert energy generated by the operation of the motor 1082 or mechanical energy from the rotation of the motor shaft 1084, such as heat, vibration, movement, or electromagnetic force into electrical energy for charging the battery 52. While the motor 1082 is operating, it can provide power for the battery 52 that powers the monitoring and control systems 10. Thus, the movement of the motor shaft 1084 can provide sufficient power to the battery charger 54 for operation of the system 10, making it a self-powering system.

According to exemplary embodiments, a control system 10 for a motor shaft 1084 can include a strain gauge sensor 22a for determining the strain on the motor shaft 1084; a secondary sensor 22 for determining at least one of: vibrations experienced by the motor shaft (vibration sensor 22b), the temperature of the motor shaft (temperature sensor 22c), and the stress experienced by the motor shaft (stress sensor 22d); a communication module 42 for communicating between the control system 10 and a remote user 1092 located at a site remote from the motor shaft 1084; a system control element 62 for receiving information obtained by the sensors 22 and communicating with a controller 1086 of the motor shaft 1084, and for communicating instructions to the controller 1086 of the motor shaft 1084; a battery 52 for powering the system 10; a battery charger 54 for powering the battery 52, the battery charger 54 powered by the operation of the motor shaft 1084; where the communication module communicates the information determined by the sensors to the remote user, and communicates instructions from the remote user to the controller of the motor.

In another aspect, the system 10 can include a system control element 62 that receives the information obtained by a plurality of sensors 22 and transmits information to the controller 1086 of the motor shaft 1084 to adjust the speed of the motor shaft 1084 when the strain gauge sensor 22a and/or some other secondary sensor 22 measures a value outside a predetermined range of values. For example, information can be sent to the controller 1086 of the motor shaft 1084 to halt operation when vibration sensor 22b registers vibrations outside of a predetermined range of values, temperature sensor 22c measures a temperature outside of a predetermined range of values, and/or stress sensor 22d measures a stress value outside of a predetermined range of values, or any combination thereof.

Such communication can take place in lieu of (or in addition to) communications to a remote user 1092 when a measurement falls outside a predetermined range of values for that measurement. For example, a message can be sent when the temperature rises above a specified temperature that is either preset or set by a remote user 1092. Such message might include the information obtained by the sensors 22 or further comprise an alarm to signal the remote user 1092 that the motor 1082 may be operating in a suboptimal manner.

In some aspects, a plurality of systems 10 may be employed to monitor or control the same motor shaft 1084 or motor 1082.

Figure 3:
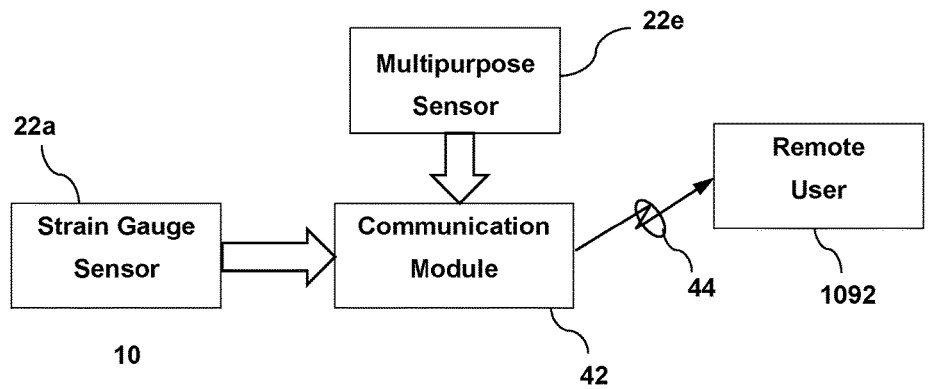
FIG. 3 is a block diagram showing a physical configuration of a motor shaft monitor system according to an exemplary embodiment.
Figure 4:
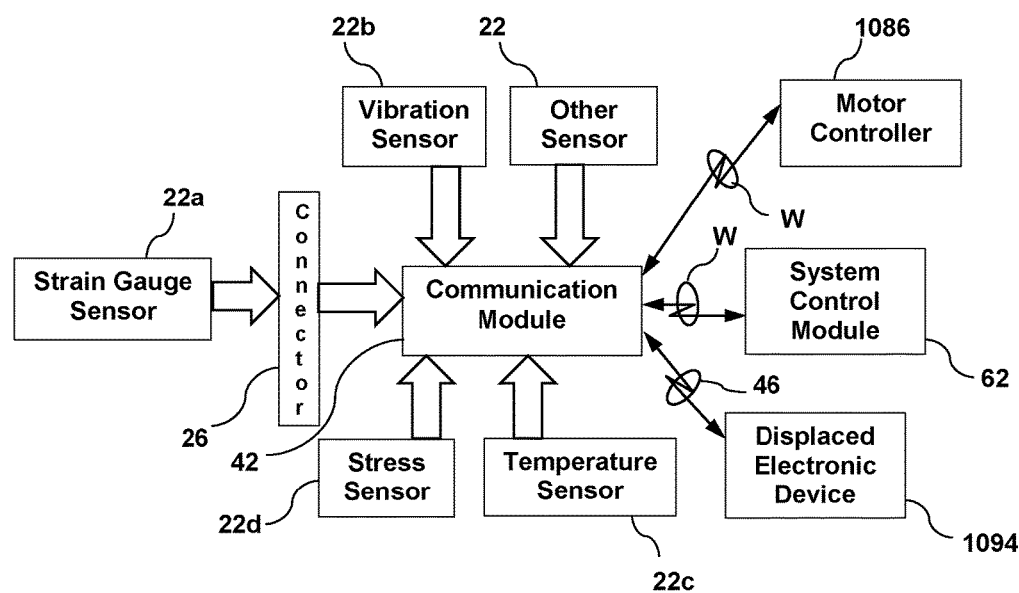
FIG. 4 is a block diagram showing a physical configuration of a motor shaft control system according to an exemplary embodiment.

FIG. 3 is a block diagram showing a physical configuration of a motor control system according to embodiments of FIG. 1. FIG. 4 is a block diagram showing a physical configuration of a motor control system according to embodiments of FIG. 2.

A further aspect according to embodiments disclosed herein can monitor and control systems by measuring the strain on a motor shaft 1084 by measuring at least one of the physical properties of or near a motor shaft 1084, such as temperature, vibration, and stress; determining if any measurement falls outside a predetermined range of values for that measurement; and transmitting a communication to a remote user 1092 when any measurement falls outside the predetermined ranges of values for that measurement.

Another aspect can further include, in response to detecting a measurement outside the predetermined ranges of values for that measurement, transmitting an alarm to a remote user. Another aspect can further include, in response to detecting a measurement outside the predetermined ranges of values for that measurement, transmitting a communication to a controller of the motor shaft. Another aspect can further include, in response to detecting a measurement outside the predetermined ranges of values for that measurement, transmitting instructions to the controller of the motor shaft to turn off the motor shaft.

From the foregoing, it will be observed that numerous variations and modifications can be effected without departing from the spirit and scope hereof. It is to be understood that no limitation with respect to the specific systems illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps can be provided, or steps can be eliminated, from the described flows, and other components can be add to, or removed from the described embodiments.

What is claimed is:

1. A system for monitoring a motor shaft comprising:
a plurality of sensors;
a communication module for communicating between the system and a displaced electronic device located at a site remote from the motor shaft;
a battery for powering the communication module; and
a battery charger for powering the battery by the operation of the motor shaft;
wherein the communication module communicates information determined by the plurality of sensors to the displaced electronic device,
wherein the communication module transmits instructions to an autonomous controller of the motor shaft to adjust a speed of the motor shaft when at least some of the information determined by the plurality of sensors is outside a predetermined range of values, and
wherein the autonomous controller of the motor shaft automatically adjusts the speed of the motor shaft in response to receiving the instructions.

2. The system of claim 1 wherein the plurality of sensors include a strain gauge sensor and a sensor for determining at least one of: vibrations experienced by the motor shaft, the temperature of the motor shaft, and the stress experienced by the motor shaft.

3. The system of claim 1 wherein the communication module comprises a strain gauge sensor and a multi-purpose sensor.

4. The system of claim 1 wherein the communication module includes a wireless communications interface which includes a computer network enabled interface.

5. The system of claim 4 wherein the communication module includes a bluetooth connection.

6. The system of claim 1 wherein the battery charger powers the battery by converting mechanical energy from rotation of the motor shaft to electrical energy.

7. The system of claim 1 wherein movement of the motor provides sufficient power to the battery charger for operation of the system.

8. An apparatus comprising the system of claim 1 and a housing for mounting on a motor shaft.

9. A control system for a motor shaft comprising:
   a strain gauge sensor for determining strain on the motor shaft;
   a secondary sensor for determining at least one of: vibrations experienced by the motor shaft, temperature of the motor shaft, and stress experienced by the motor shaft;
   a communication module for communicating between the control system and a remote user located at a site remote from the motor shaft;
   a system control element for receiving information obtained by the strain gauge sensor and the secondary sensor, and communicating with an autonomous controller of the motor shaft, and for communicating instructions to the autonomous controller of the motor shaft;
   a battery for powering the control system; and
   a battery charger for powering the battery, the battery charger powered by operation of the motor shaft,
   wherein the communication module communicates information determined by the strain gauge sensor and the secondary sensor to the remote user, and communicates instructions from the remote user to the autonomous controller of the motor,
   wherein the instructions from the remote user to the autonomous controller of the motor includes instructions to adjust a speed of the motor shaft when the strain gauge sensor measures a value outside a predetermined range of values, and
   wherein the autonomous controller of the motor shaft automatically adjusts the speed of the motor shaft in response to receiving the instructions.

10. The control system of claim 9 wherein the battery charger converts heat into power for the battery.

11. The control system of claim 9 wherein the secondary sensor measures vibrations experienced by the motor shaft, temperature of the motor shaft, and the stress experienced by the motor shaft.

12. An apparatus comprising the control system of claim 9 and a housing for connecting to a motor shaft.

13. A method comprising:
   measuring strain on a motor shaft;
   measuring at least one of temperature, vibration, and stress experienced by a motor shaft;
   determining if any measurement falls outside a predetermined range of values for the measurement;
   transmitting a communication to a remote user when any measurement falls outside the predetermined range of values for that measurement;
   in response to detecting a measurement outside the predetermined range of values for that measurement, transmitting instructions to an autonomous controller of the motor shaft to a adjust speed of the motor shaft; and
   the autonomous controller of the motor shaft automatically adjusting the speed of the motor shaft in response to receiving the instructions.

14. A method as in claim 13 further comprising:
   in response to detecting a measurement outside the predetermined range of values for that measurement, transmitting an alarm to a remote user.

15. A method as in claim 13 wherein the instructions direct the autonomous controller of the motor shaft to turn off the motor shaft.

* * * * *